(12) United States Patent
You

(10) Patent No.: US 8,862,284 B2
(45) Date of Patent: Oct. 14, 2014

(54) APPARATUS AND METHOD FOR NEUTRAL-POSITION PARKING IN SHIFT-BY-WIRE SYSTEM

(75) Inventor: Jung Keun You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 551 days.

(21) Appl. No.: 13/172,130

(22) Filed: Jun. 29, 2011

(65) Prior Publication Data
US 2012/0271488 A1  Oct. 25, 2012

(30) Foreign Application Priority Data

Apr. 21, 2011  (KR) .................. 10-2011-0037017

(51) Int. Cl.
G05D 1/00 (2006.01)
G05D 3/00 (2006.01)

(52) U.S. Cl.
USPC ......... 701/2; 701/36; 701/51; 701/62; 74/335

(58) Field of Classification Search
USPC .............. 701/2, 51, 36, 62; 192/220.2, 220.4, 192/114 R; 475/65; 477/165; 340/426.14; 74/335
See application file for complete search history.

(56) References Cited

U.S. PATENT DOCUMENTS

| | | | | |
|---|---|---|---|---|
| 6,699,155 | B2 * | 3/2004 | Nagasaka | 477/94 |
| 6,779,645 | B2 * | 8/2004 | Nagasaka et al. | 192/219.6 |
| 7,143,857 | B2 * | 12/2006 | Ichikawa et al. | 180/289 |
| 7,171,293 | B2 * | 1/2007 | Ichikawa et al. | 701/36 |
| 8,075,447 | B2 * | 12/2011 | Hori et al. | 477/110 |
| 2002/0055410 | A1 * | 5/2002 | Nagasaka | 477/94 |
| 2002/0170800 | A1 * | 11/2002 | Nagasaka et al. | 192/219.6 |
| 2003/0076221 | A1 * | 4/2003 | Akiyama et al. | 340/310.01 |
| 2004/0104588 | A1 * | 6/2004 | Ichikawa et al. | 296/37.1 |
| 2004/0107031 | A1 * | 6/2004 | Ichikawa et al. | 701/36 |
| 2006/0283279 | A1 * | 12/2006 | Levin et al. | 74/471 XY |
| 2008/0242506 | A1 * | 10/2008 | Hori et al. | 477/165 |
| 2011/0112732 | A1 * | 5/2011 | Ueno | 701/51 |
| 2012/0271488 | A1 * | 10/2012 | You | 701/2 |

FOREIGN PATENT DOCUMENTS

DE  112009001673 T5 *  5/2011
JP  2009-138338 A  6/2009

(Continued)

OTHER PUBLICATIONS

Remote Monitoring Intelligent System Based on Fingerprint Door Lock; Wu Ping ; Wu Guichu ; Xie Wenbin ; Lu Jianguo ; Li Peng Intelligent Computation Technology and Automation (ICICTA), 2010 International Conference on; vol. 2; Digital Object Identifier: 10.1109/ICICTA.2010.436; Publication Year: 2010, pp. 1012-1014.*

(Continued)

Primary Examiner — Cuong H Nguyen
(74) Attorney, Agent, or Firm — Edwards Wildman Palmer LLP; Peter F. Corless

(57) ABSTRACT

The present invention provides a neutral-position parking apparatus and method in a shift-by-wire system. The neutral-position parking apparatus connects a shift-by-wire unit to a smart key control ECU through a controller area network (CAN) communication to perform a control of maintaining a neutral position according to a control command of the smart key control ECU receiving a door lock signal from a smart key. Also, the neutral-position parking apparatus communicably connects a power distributor to the smart key control ECU to power off a vehicle upon neutral-position parking according to the control command of the smart key control ECU receiving the door lock signal from the smart key.

10 Claims, 5 Drawing Sheets

(56) References Cited

FOREIGN PATENT DOCUMENTS

| | | | |
|---|---|---|---|
| JP | 2010-190311 | | 9/2010 |
| JP | 2010-242898 A | | 10/2010 |
| KR | 10-0513516 | | 9/2005 |
| KR | 10-0872628 | | 12/2008 |
| KR | 2012 1 19231 A | * | 10/2012 |
| WO | WO 2010004839 | * | 1/2010 |

OTHER PUBLICATIONS

SMaRTCaR: An integrated smartphone-based platform to support traffic management applications; Campolo, C. ; Iera, A. ; Molinaro, A. ; Paratore, S.Y. ; Ruggeri, G.; Vehicular Traffic Management for Smart Cities (VTM), 2012 First International Workshop on; Digital Object Identifier: 10.1109/VTM.2012.6398700; Publication Year: 2012, pp. 1-6.*

* cited by examiner

APPARATUS AND METHOD FOR NEUTRAL-POSITION PARKING IN SHIFT-BY-WIRE SYSTEM

CROSS-REFERENCE TO RELATED APPLICATION

This application claims under 35 U.S.C. §119(a) the benefit of Korean Patent Application No. 10-2011-0037017 filed Apr. 21, 2011, the entire contents of which are incorporated herein by reference.

BACKGROUND (a) Technical Field

The present invention relates to an apparatus and method for a neutral-position parking in a shift-by-wire system. More particularly, it relates to an apparatus and method for a neutral-position parking in a shift-by-wire system that is a sort of electronic gear transmission, which enables a more convenient parking and power-off operation at the neutral position in the shift-by-wire system.

(b) Background Art

In an automatic transmission of a shift-by-wire type, as a pressure is applied or blocked to hydraulic circuits for each step by an electric motor or a solenoid that operates according to electronic signals ordered by a transmission control unit (TCU), electronic transmission shift control is performed.

Transmission shifting in a shift-by-wire system has an advantage in that shifting manipulation to Drive (D), Reverse (R), Neutral (N), and Parking (P) positions is more conveniently performed by delivering a driver's shifting intention to a transmission control unit through simple button manipulation and lever manipulation. Also, since a transmission lever can be miniaturized, a space between a driver seat and a passenger seat increases, thereby securing an installation space for a joystick.

In a transmission operation in a typical shift-by-wire system, when an engine stops operating at the Drive (D) or Reverse (R) position, the transmission lever is automatically shifted to the parking (P) position. Accordingly, the typical shift-by-wire system provides a convenience to a driver in that a separate manipulation for shifting is not necessary.

However, a typical shift-by-wire system has the following limitation in a neutral-position parking.

FIGS. 4 and 5 are views illustrating a process of parking a vehicle mounted with a typical shift-by-wire system at the neutral position (hereinafter, referred to as N-position). First, an engine is turned off in the parking position (hereinafter, refer to as P-position). Thereafter, a release switch 30 disposed at the front of a shift-by-wire (SBW)-based transmission lever 40 is pushed in a state of stepping on a brake pedal (brake-on state) to release locking of the transmission lever, and then the transmission lever is automatically shifted to the N position by an actuator.

When an engine is turned off at the N position, the N position is maintained, and N-position parking is possible. However, since the P-position parking is desirable to prevent a vehicle from sliding at a slope, upon turning-off at the N-position, a control logic is currently applied to prevent electrical parts from being turned off and to prevent a door from being locked by a door lock/unlock actuator.

Thus, when a driver intends to perform an N-position parking, there is an inconvenience in that the engine and the electrical parts have to be turned off at the P-position, and then the release switch has to be pushed in a brake-on state to shift the transmission lever to the N position.

Also, when the transmission lever is shifted to the N position in a state where the release switch is pushed, an operation sound (e.g., buzzing or whirring sound) of an actuator that provides a shifting force to the transmission lever may become a noise.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for a neutral-position parking in a shift-by-wire system, which facilitates a neutral-position parking by turning off an engine of a vehicle mounted with shift-by-wire, transmitting a door lock signal from a smart key carried by a driver (e.g., outside a vehicle) to a smart key control ECU, ordering, by the smart key control ECU receiving the door lock signal, a vehicle power-off command to a power distributor, and powering off the vehicle by the power distributor receiving the vehicle power-off command, while the vehicle is maintained in the neutral-position.

In one aspect, the present invention provides a neutral-position parking apparatus in a shift-by-wire system, connecting a shift-by-wire unit to a smart key control ECU through a controller area network (CAN) communication to perform a control of maintaining a neutral position according to a control command of the smart key control ECU receiving a door lock signal from a smart key, and communicably connecting a power distributor to the smart key control ECU to power off a vehicle upon neutral-position parking according to the control command of the smart key control ECU receiving the door lock signal from the smart key.

In an illustrative embodiment, the smart key control ECU may be connected to a door module that controls an operation of a door lock/unlock actuator.

In another aspect, the present invention provides a neutral-position parking method in a shift-by-wire system, including: turning off an engine in a state where a shift-by-wire (SBW)-based transmission is maintained at a neutral position; transmitting a door lock signal from a smart key (e.g., carried by a driver outside a vehicle) to a smart key control ECU; ordering, by the smart key control ECU receiving the door lock signal, a vehicle power-off command to a power distributor; and powering off the vehicle by the power distributor receiving the vehicle power-off command, while the transmission is maintained in the neutral position.

In an illustrative embodiment, the method may further include: ordering, by the smart key control ECU receiving the door lock signal, a neutral-position maintenance command to a shift-by-wire unit; and maintaining a transmission at a neutral position by a control of the shift-by-wire unit.

In another illustrative embodiment, the method may further include: ordering, by the smart key control ECU receiving the door lock signal, a door lock command to a door module; and locking a door by actuating a door lock/unlock actuator toward a door lock by a control of the door module.

Other aspects and illustrative embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
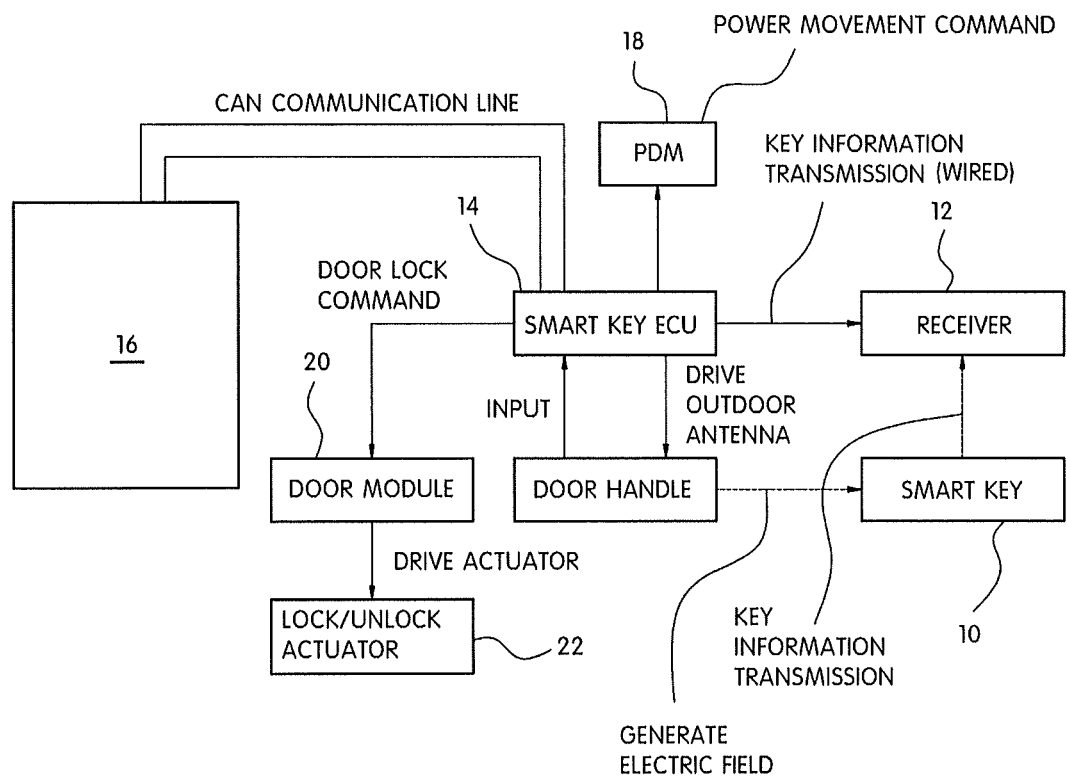
FIG. 1 is a view illustrating a neutral position parking apparatus of a shift-by-wire (SBW) system according to an embodiment of the present invention.

Reference numerals set forth in the Drawings includes reference to the following elements as further discussed below:

10: smart key;
12: receiver;
14: smart key control ECU;
16: shift-by-wire unit;
18: power distributor;
20: door module; and
22: door lock/unlock actuator.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

As described above, a typical N-position parking process using the current transmission process of the shift-by-wire (SBW) system has an inconvenience in that various operations have to be performed, such as turning off electrical parts by turning off an engine, stepping on a brake, and pushing a release switch. In order to solve such an inconvenience, the present invention is focused on a point that a very simple and convenient N-position parking is performed in a shift-by-wire system.

For this, with reference to FIG. 1, a smart key control engine control unit (ECU) 14 for controlling locking and unlocking of a door by receiving a signal from a smart key 10, and a SBW unit 16 for controlling transmission may be connected via controller area network (CAN) communication. Also, the smart key control ECU 14 and a power distributor 18 for controlling power distribution for electrical parts (e.g., various indicator lights and displays of a cluster, audio, and interior lamps) may be connected to enable electrical signal exchange.

Accordingly, the SBW unit 16 may perform control for maintaining the N position according to a control command of the smart key control ECU 14 receiving a door lock signal from the smart key 10. Also, the power distributor 18 may perform control for turning off electrical parts of a vehicle according to a control command of the smart key control ECU 14 receiving a door lock signal from the smart key 10.

When the smart key control ECU 14 receiving the door lock signal from the smart key 10 orders a door lock command to a door module 20, a door may be locked by a door lock/unlock actuator 22 according to the control of the door module 20.

Figure 2:
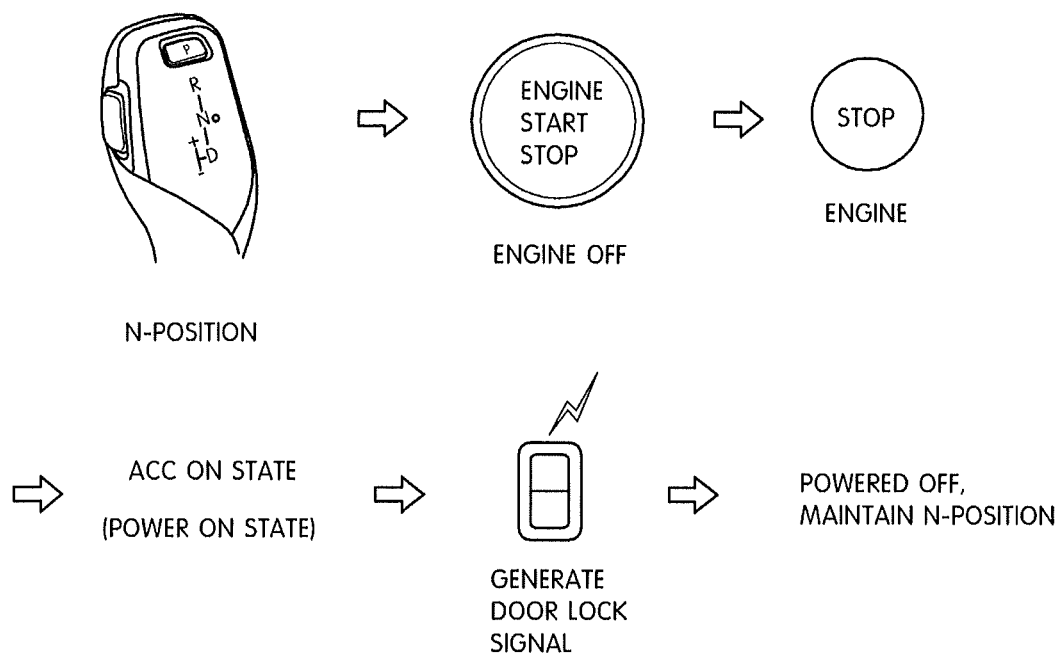
FIG. 2 is a schematic view illustrating an operation process of a neutral position parking apparatus of a shift-by-wire system according to an embodiment of the present invention.
Figure 3:
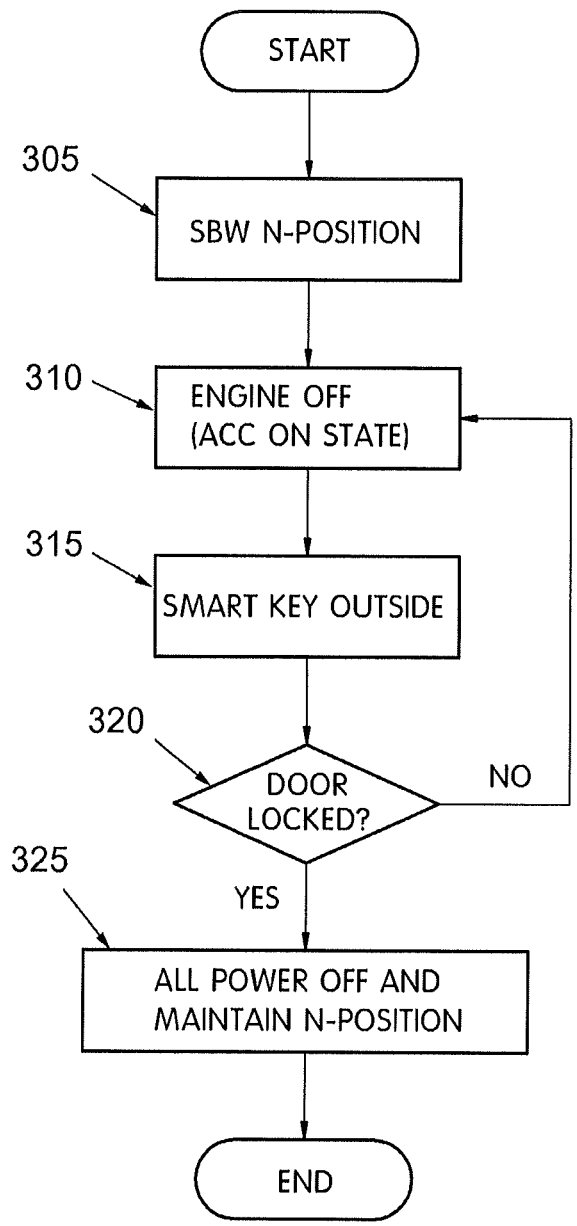
FIG. 3 is a flowchart illustrating an operation process of a neutral position parking apparatus of a shift-by-wire system according to an embodiment of the present invention.
Figure 4:
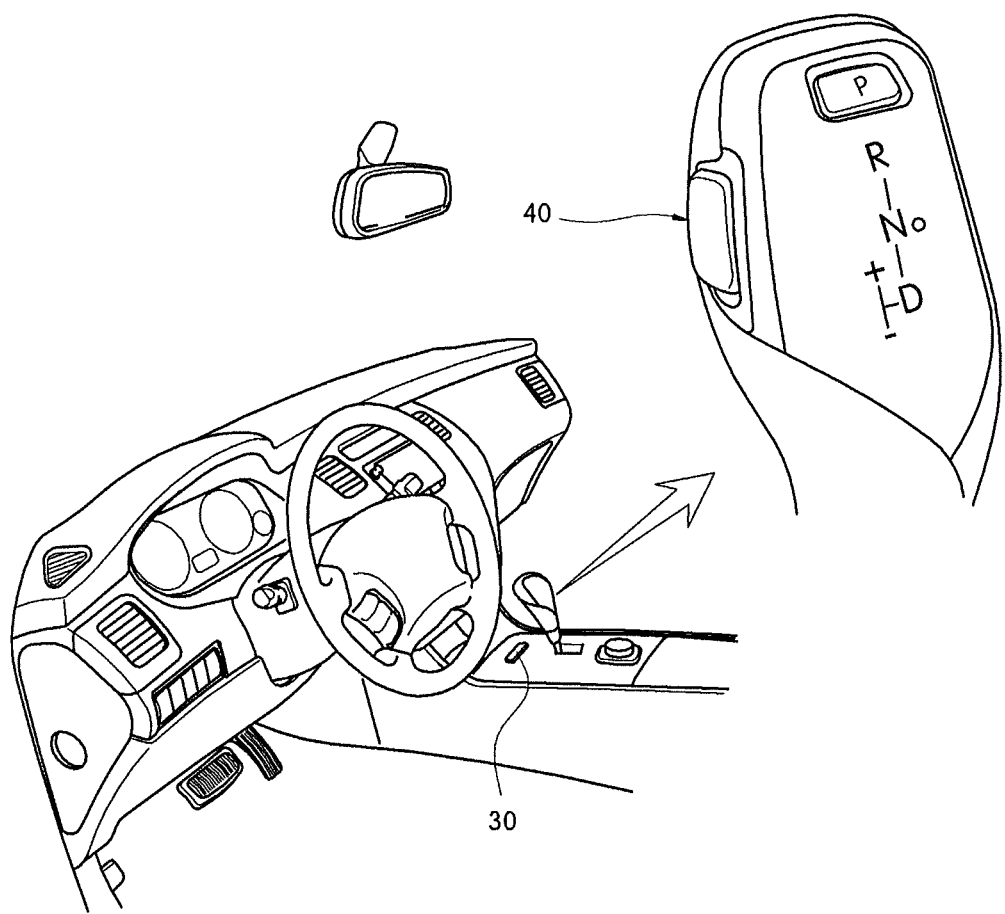
FIG. 4 is a perspective view illustrating a SBW-based transmission lever.
Figure 5:
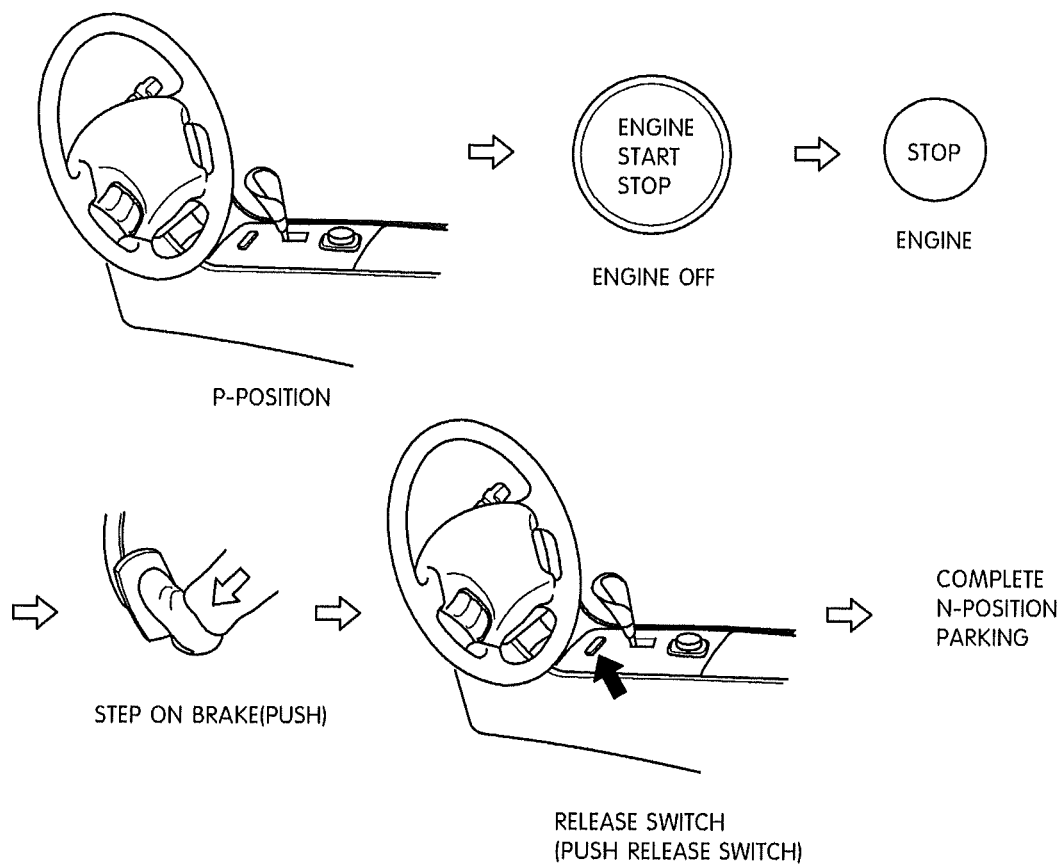
FIG. 5 is a schematic view illustrating a neutral-position parking method in a typical shift-by-wire system.

Hereinafter, a neutral position parking method in a shift-by-wire system according to an embodiment of the present invention will be described in detail with reference to FIG. 2 and FIG. 3 of the accompanying drawings.

First, while in a state where the transmission is maintained at the N-position in a shift-by-wire system (step 305), an engine may be turned off (step 310).

Next, a driver may optionally open a door and get out of a vehicle (step 315), and then in step 320 may push a locking button of a smart key 10, e.g., from outside the vehicle. Thus, a door lock signal may be transmitted from the smart key 10 carried by the driver to the smart key control ECU 14.

Next, the smart key control ECU 14 receiving the door lock signal may order a vehicle power-off command to the power distributor 18. Thus, the power distributor 18 receiving the power-off command may interrupt power distribution to the various electrical parts (e.g., various indicator lights and displays of a cluster, audio, and interior lamps) to power off the electrical parts (step 325).

Simultaneously (also in step 325), the smart key control ECU 14 receiving the door lock signal may order an N-position maintenance command to the SBW unit 16, and thus the transmission may be maintained at the N-position by the control of the SBW unit 16 such that the transmission is not shifted from the N-position to the P-position.

Thus, when an engine of a vehicle mounted with a SBW system is turned off in the N-position state, and then a driver generates a door lock signal using the smart key 10 carried by the driver (e.g., outside the vehicle/door), the interior electrical parts of the vehicle may be powered off according to the control command of the smart key control ECU 14, and simultaneously the transmission may be maintained in the N-position. Accordingly, a customer convenience in the N-position parking can be enhanced.

Along with the above process of the N-position parking logic, the smart key control ECU 14 receiving a door lock signal may order a door lock command to the door module 20. Thus, the door module 20 may control the door lock/unlock actuator 22 to be actuated toward a door lock to lock the door.

In other places, a user places the vehicle's transmission in the N-position using a shift-by-wire unit, turns the engine off, locks the doors with a smart key (e.g., from outside of the vehicle), and then in response, the vehicle is powered off while maintaining the N-position.

According to an embodiment of the present invention, therefore, a neutral-position parking in a shift-by-wire system can be very conveniently performed by powering off various electrical parts according to a command an ECU receiving a door lock signal from a smart key and simultaneously maintaining a neutral position even when an engine of a vehicle is turned off in a state where a transmission in a shift-by-wire system is maintained at the neutral position.

An inconvenience of a typical neutral-position parking including various steps such as turning off an engine in the parking-position to power off electrical parts and pushing a release switch in a state of stepping on a brake pedal to shift a transmission lever to the neutral position can thus be solved to enhance customer convenience.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A neutral-position parking apparatus in a shift-by-wire system in a vehicle, the apparatus comprising:
   a shift-by-wire unit;
   a smart key control engine control unit (ECU) connected to the shift-by-wire unit and configured to perform a control of maintaining a neutral position according to a control command of the smart key control ECU receiving a door lock signal from a smart key positioned outside of the vehicle; and
   a power distributor communicably connected to the smart key control ECU and configured to power off the vehicle upon neutral-position parking according to the control command of the smart key control ECU receiving the door lock signal from the smart key, wherein the power distributor is configured to power off the vehicle in a state where an engine is turned off and a shift-by-wire (SBW)-based transmission is maintained at the neutral position,
   wherein the smart key control ECU is connected to the shift-by-wire unit through a controller area network (CAN) communication.

2. The neutral-position parking apparatus of claim 1, further comprising a door module connected to the smart key control ECU and configured to control an operation of a door lock/unlock actuator.

3. A vehicle, comprising:
   an engine;
   a transmission;
   a power distributor;
   a shift-by-wire unit to control the transmission;
   a smart key control engine control unit (ECU) connected to the shift-by-wire unit and configured to:
   receive a door lock signal from a smart key positioned outside of the vehicle; and
   in response to both the engine being off and also the transmission being in a neutral position when the door lock signal is received, order the power distributor to power off the vehicle; and
   a controller area network (CAN) communication through which the smart key control ECU is connected to the shift-by-wire unit.

4. A neutral-position parking method for use with a shift-by-wire system in a vehicle, the method comprising:
   turning off an engine in a state where a shift-by-wire (SBW)-based transmission is maintained at a neutral position;
   receiving a door lock signal from a smart key positioned outside of the vehicle, at a smart key control engine control unit (ECU), in a state where the engine is turned off and the shift-by-wire (SBW)-based transmission is maintained at the neutral position;
   ordering, by the smart key control ECU receiving the door lock signal, a vehicle power-off command to a power distributor in the state where the engine is turned off and the shift-by-wire (SBW)-based transmission is maintained at the neutral position; and
   powering off the vehicle by the power distributor receiving the vehicle power-off command in the state where the engine is turned off and the shift-by-wire (SBW)-based transmission is maintained at the neutral position.

5. The neutral-position parking method of claim 4, further comprising:
   ordering, by the smart key control ECU receiving the door lock signal, a neutral-position maintenance command to a shift-by-wire unit; and
   maintaining a transmission at a neutral position by a control of the shift-by-wire unit.

6. The neutral-position parking method of claim 4, further comprising:
   ordering, by the smart key control ECU receiving the door lock signal, a door lock command to a door module; and
   locking a door by actuating a door lock/unlock actuator toward a door lock by a control of the door module.

7. The neutral-position parking method of claim 4, wherein the smart key is carried by a driver outside a vehicle.

8. The vehicle of claim 3, wherein the smart key is carried by a driver outside a vehicle.

9. The vehicle of claim 3, wherein the smart key control ECU receiving the door lock signal is further configured to order a neutral-position maintenance command to the shift-by-wire unit, and wherein the shift-by-wire unit is configured to maintain the transmission at the neutral position in response.

10. The vehicle of claim 3, further comprising:
    a door module; and
    a door lock/unlock actuator;
    wherein the smart key control ECU receiving the door lock signal is further configured to order a door lock command to the door module, and wherein the door module is configured to lock a door by actuating the door lock/unlock actuator toward a door lock in response.

* * * * *